(12) United States Patent
Ding

(10) Patent No.: US 12,305,402 B2
(45) Date of Patent: May 20, 2025

(54) WIND IN AND WIND OUT STRUCTURE OF AWNING AND APPLICATION THEREOF

(71) Applicant: LISHI (SHANGHAI) SUNSHADE TECHNOLOGY CO., LTD, Shanghai (CN)

(72) Inventor: Linfeng Ding, Shanghai (CN)

(73) Assignee: LISHI (SHANGHAI) SUNSHADE TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 17/788,329

(22) PCT Filed: Apr. 21, 2022

(86) PCT No.: PCT/CN2022/088065
§ 371 (c)(1),
(2) Date: Jun. 23, 2022

(87) PCT Pub. No.: WO2023/201603
PCT Pub. Date: Oct. 26, 2023

(65) Prior Publication Data
US 2025/0034898 A1  Jan. 30, 2025

(51) Int. Cl.
*B60J 11/02* (2006.01)
*E04F 10/06* (2006.01)
(Continued)

(52) U.S. Cl.
CPC .............. *E04F 10/06* (2013.01); *B60J 11/02* (2013.01); *E04H 15/58* (2013.01); *E04H 15/06* (2013.01); *E04H 15/08* (2013.01)

(58) Field of Classification Search
CPC .................................................. Y10S 135/903
See application file for complete search history.

(56) References Cited

U.S. PATENT DOCUMENTS 3,364,973 A * 1/1968 Railson ................... B60P 3/343
135/117
5,170,811 A * 12/1992 Kirk ........................ E04H 15/08
135/88.13
(Continued)

FOREIGN PATENT DOCUMENTS

KR        101873769 B1 *  7/2018

*Primary Examiner* — David R Dunn
*Assistant Examiner* — Danielle Jackson
(74) *Attorney, Agent, or Firm* — Hemisphere Law, PLLC; Zhigang Ma

(57) ABSTRACT

The present invention relates to the field of awnings, specifically to a wind in and wind out structure for protecting an awning. The wind in and wind out structure includes a rear housing; an inside of the rear housing is rotatably connected with a reel pipe; a surface of the reel pipe is wound with an awning fabric; one end of the awning fabric is connected with a front rod; a front end of the rear housing is provided with a driving-end inner side cover; an outer side of the driving-end inner side cover is sleeved with a driving-end decorative cover; a rear end of the rear housing is provided with a driven-end inner side cover; an outer side of the driven-end inner side cover is sleeved with a driven-end decorative cover; the reel pipe is mounted between the driving-end inner side cover and the driven end inner side cover; an automatic rollback mechanism is arranged inside the reel pipe; and the driving-end decorative cover and the driven-end decorative cover are provided with locking structures used for locking or unlocking the wound front rod. The present invention solves the technical problems that an existing awning is easy to open and is inconvenient to wind in, wind out, and use, and enhances the use experience of the awning on an automobile, a recreational vehicle, and other vehicles.

9 Claims, 6 Drawing Sheets

(51) Int. Cl.
*E04H 15/58* (2006.01)
*E04H 15/06* (2006.01)
*E04H 15/08* (2006.01)

(56) References Cited

U.S. PATENT DOCUMENTS

| | | | | |
|---|---|---|---|---|
| 6,874,559 B1* | 4/2005 | Hicks | ............... | E04F 10/0685 |
| | | | | 160/22 |
| 7,219,709 B1* | 5/2007 | Williams | ............ | E01F 13/028 |
| | | | | 160/24 |
| 7,789,122 B2* | 9/2010 | Ito | ............ | E04F 10/0611 |
| | | | | 160/55 |
| 8,316,910 B2* | 11/2012 | Popa | ............ | E04F 10/0622 |
| | | | | 160/46 |
| 9,695,635 B2* | 7/2017 | Taylor | ............ | E04F 10/0603 |
| 11,001,188 B2* | 5/2021 | McKinnon | ............ | B60Q 1/0023 |
| 11,613,894 B2* | 3/2023 | Ma | ............ | E04F 10/0648 |
| | | | | 160/52 |
| 2007/0246168 A1* | 10/2007 | Ito | ............ | E04F 10/0618 |
| | | | | 160/22 |
| 2008/0053624 A1* | 3/2008 | Ito | ............ | E04F 10/0692 |
| | | | | 160/75 |
| 2008/0277073 A1* | 11/2008 | Ito | ............ | E04F 10/06 |
| | | | | 160/67 |
| 2009/0025887 A1* | 1/2009 | Ito | ............ | E04F 10/0692 |
| | | | | 160/25 |
| 2009/0050277 A1* | 2/2009 | Ito | ............ | E04F 10/0618 |
| | | | | 160/67 |
| 2010/0258252 A1 | 10/2010 | Brutsaert | | |
| 2011/0304823 A1 | 12/2011 | Wensing et al. | | |
| 2021/0138883 A1 | 5/2021 | Pearce | | |

\* cited by examiner

WIND IN AND WIND OUT STRUCTURE OF AWNING AND APPLICATION THEREOF

TECHNICAL FIELD

The present invention relates to the technical field of awnings, in particular, to a wind in and wind out structure of an awning and an application thereof.

BACKGROUND ART

Current automobiles, recreational vehicles, and other vehicles are often equipped with awnings to shield sunlight, rain, snow, dust, etc., and improve the service comfort of the vehicles. However, when the existing awning is wound, the awning may be spread due to bumps during driving, which is very inconvenient to use. Many awning products are manually operated: to use the awning, opening a zipper, then rolling out an awning fabric, and mounting a support rod; and to pack up the awning, rolling up the fabric little by little. The operations are troublesome. In addition, in this process, the awning fabric will rotate after being spread, causing the awning fabric to be rolled up, which is very inconvenient to use.

SUMMARY

The present invention aims to provide a wind in and wind out structure of an awning and an application thereof, so as to solve the technical problems that an existing awning is easy to mis-open, is inconvenient to wind in and wind out, and the like, and improve the use experience of an awning on automobiles, recreational vehicles, and other vehicles.

The technical solutions of the present invention are as follows.

A wind in and wind out structure of an awning provided by the present invention includes a rear housing; the inside of the rear housing is connected with a rotating reel pipe; a surface of the reel pipe is wound with an awning fabric; one end of the awning fabric is connected with a front rod; a front end of the rear housing is provided with a driving-end inner side cover; an outer side of the driving-end inner side cover is sleeved with a driving-end decorative cover; a rear end of the rear housing is provided with a driven-end inner side cover; an outer side of the driven-end inner side cover is sleeved with a driven-end decorative cover; the reel pipe is mounted between the driving-end inner side cover and the driven end inner side cover; an automatic rollback mechanism is arranged inside the reel pipe; and the driving-end decorative cover and the driven-end decorative cover are provided with locking structures used for locking or unlocking the wound front rod.

Alternatively, in the present invention, the automatic rollback mechanism is disposed as follows: an inner end of the driving-end inner side cover is fixedly connected with a volute spiral spring shaft; an outer side of the spring shaft close to the driving-end inner side cover is connected with a rotating driving-end pipe stopper; one end of the driving-end pipe stopper facing away from the driving-end inner side cover is fixedly connected with a volute spiral spring; the spring is sleeved on the outer side of the spring shaft; the other end of the spring is fixedly connected to the spring shaft; the end of the driving-end pipe stopper facing away from the driving-end inner side cover is fixedly connected with one end part of the reel pipe; the volute spiral spring is arranged inside the reel pipe; the other end part of the reel pipe is fixedly connected with a driven-end pipe stopper; one end of the driven-end pipe stopper facing away from the reel pipe is fixedly connected with a driven-end fixing pin; and the driven-end fixing pin is rotatably connected into the driven-end inner side cover.

Alternatively, in the present invention, the locking structures include locking bars; two ends of the front rod are cooperatively provided with front rod side covers; corresponding via holes are formed inside the driving-end decorative cover, the driving-end inner side cover, and the front rod side covers; the locking bars penetrate through the corresponding via holes of the driving-end decorative cover, the driving-end inner side cover, and the front rod side covers, so as to be plugged into or pulled out of the front rod to lock or unlock the front rod.

Alternatively, in the present invention, outer sides of the locking bars are sleeved with springs; one end of each spring is stopped to each locking bar, and the other end is stopped in the driving-end decorative cover; an outer end of each locking bar is rotatably connected with a wrench; a groove is formed in a surface of the driving-end decorative cover; and the wrench is matched with the groove.

Alternatively, in the present invention, one side end of the driving-end pipe stopper close to the driving-end inner side cover is fixedly connected with a self-locking ratchet, and/or one side end of the driven-end pipe stopper close to the driven-end inner side cover is fixedly connected with a self-locking ratchet; a surface of each self-locking ratchet includes a neutral position part and a tooth part; an inner side of the driving-end inner side cover and/or the driven-end inner side cover is rotatably connected with a self-locking pawl through a rotating shaft; the rotating shaft of the self-locking pawl is sleeved with a first torsional spring; one end of the first torsional spring presses against an inner surface of the driving-end inner side cover and/or the driven-end inner side cover; and the other end of the first torsional spring presses against a surface of the self-locking pawl.

Alternatively, in the present invention, an ejection mechanism is arranged inside the driving-end inner side cover and/or the driven-end inner side cover in a penetrating manner; the ejection mechanism includes a support plate which rotatably connected to an inner wall of the driving-end inner side cover and/or the driven-end inner side cover through a connection shaft; an upper surface of one end of the support plate is connected with an ejection subassembly; an upper end of the driving-end inner side cover and/or the driven-end inner side cover is provided with an opening; a through hole is formed in a surface of the upper end of the driving-end inner side cover and/or the driven-end inner side cover; the positions of the ejection subassembly, the through hole, and the opening are correspondingly disposed; the self-locking pawl in a natural state is in contact with a surface of a lower end of the support plate; and the self-locking pawl jacks up the support plate when meshed with the self-locking ratchet.

Alternatively, in the present invention, the connection shaft of the support plate is sleeved with a second torsional spring; one end of the second torsional spring is connected with the inner wall of the driving-end inner side cover and/or the driven-end inner side cover; and the other end of the second torsional spring is connected with the support plate.

Alternatively, in the present invention, the ejection subassembly includes a waterproof cover; the waterproof cover is matched with the through hole; a lower end of the waterproof cover on an inner surface of the through hole is provided with a sealing ring; a lower surface of the waterproof cover is hooked with a support rod; and a lower end of the support rod is connected with the support plate.

Alternatively, in the present invention, the driving-end inner side cover is detachably mounted in one end of the driving-end decorative cover; and the driven-end inner side cover is detachably mounted in one end of the driven-end decorative cover.

Alternatively, in the present invention, one end of the driven-end fixing pin penetrates through the driven-end inner side cover and is fixedly connected with an end socket part; a screw hole is formed in a surface of the end socket part; a prestress can be applied to the torsional spring in the reel pipe after the driven-end decorative cover is removed; and manual winding is carried out when the torsional spring fails.

Alternatively, the present invention further provides an application of the above-mentioned wind in and wind out structure of the awning. The wind in and wind out structure of the awning is applied to an automobile and a recreational vehicle and is used for shielding sunlight, rain, snow or dust. A lamp/led strip and/or a tent can also be selectively mounted on the wind in and wind out structure of the awning.

The present invention has the following beneficial effects.

1. When the awning fabric is spread, the reel pipe will be pulled to rotate under the action of the driving-end pipe stopper and the driven-end pipe stopper. Since one end of the volute spiral spring is fixedly connected with the driving-end pipe stopper, and the other end of the volute spiral spring is fixedly connected with the surface of the volute spiral spring shaft, when the driving-end pipe stopper rotates, the spring can rotate to generate a volute spiral spring torsion; when it is necessary to roll up the awning fabric, the spring torsion of the volute spiral spring will drive the reel pipe to automatically retract, instead of manually rotating the reel pipe, so that the operation is relatively convenient, and man power is saved.

2. When the awning fabric is spread, the awning fabric is pulled to cause the reel pipe to rotate, through the driving-end pipe stopper, the spring shaft, the driven-end pipe stopper and a pin shaft, between the driving-end inner side cover and the driven-end inner side cover. In this process, the rotation of the driving-end pipe stopper will cause the volute spiral spring to rotate to generate a spring torsion, which is convenient for the roll-up of the awning fabric. By the theory of the ratchets, the driving-end pipe stopper can drive the self-locking ratchets to clockwise rotate. When the self-locking ratchets clockwise rotate, the tooth parts are meshed with the self-locking pawl to compress the first torsional spring. The self-locking ratchets may be locked by the self-locking pawl when anticlockwise rotating, so that the reel pipe cannot rotate reversely to roll up the awning fabric. At the same time, the self-locking ratchets can push the self-locking pawl to the upper right position, and the support plate can be jacked up through the self-locking pawl, so that the waterproof cover at the upper end of the support plate is ejected out of the surface of the through hole, and it can be directly seen that the awning fabric is in a locked state at this time. When it is necessary to roll up the awning fabric, the awning fabric is outwards pulled at first to enable the self-locking pawl to point to the neural position parts of the self-locking ratchets. At this time, the self-locking pawl can be rebounded to an initial position at 0 degree through the first torsional spring. When the awning fabric is rolled up, the self-locking ratchets push the self-locking pawl to the left position, and the self-locking pawl is not meshed with the tooth parts of the self-locking ratchets. A resilience force of the volute spiral spring can make the reel pipe to reversely rotate to roll up awning fabric. When the self-locking pawl is at the left position, it does not extrude the support plate, and the support plate is reset under the action of the second torsional spring, so that the waterproof cover can be moved into the through hole. This device can prevent the awning fabric from rotating back after the awning fabric is spread and firmly fix the awning fabric, can directly show whether the awning fabric is in the locked state, and is convenient for the unlocking operation.

3. When a winding torsional spring fails or is stuck, a driven-end decorative cover can be removed from driven-end inner side cover, and an electric drill, a screwdriver, or other tools is inserted into a rotating hole to rotate a fixed pin shaft, which achieves an emergency purpose and avoids the problem that the winding torsional spring fails in driving the awning fabric to be rolled up, and the operation is relatively convenient.

4. Before the awning fabric is spread, the wrenches are rotated to be pulled out of the grooves. The wrenches are pulled to separate the rear ends of the locking bars from the front rod and the front rod side covers, and the springs are compressed. At this time, the front rod can be pulled to pull the awning fabric out of the rear housing. After the awning fabric is completely rolled up, in order to prevent the awning from being opened by bump or other reasons, the wrenches can be released at this time to cause the locking bars to be inserted into the front rod and the front rod side covers. The front rod side covers can be fixed by the locking bars, so that the awning fabric is avoided from sliding out of the rear housing; the fixing is firmer, and the operation is convenient. The wrenches are rotated to snap the fabric in the grooves to reduce the occupied space and make it look beautiful.

BRIEF DESCRIPTION OF THE DRAWINGS

In order to explain the technical solutions of the embodiments of the present invention more clearly, the following will briefly introduce the accompanying drawings used in the embodiments. It should be understood that the drawings in the following description only illustrate some embodiments of the present invention and thus shall not be deemed as limiting the scope. Those of ordinary skill in the art can obtain other related drawings based on these drawings without creative work.

Figure 1:
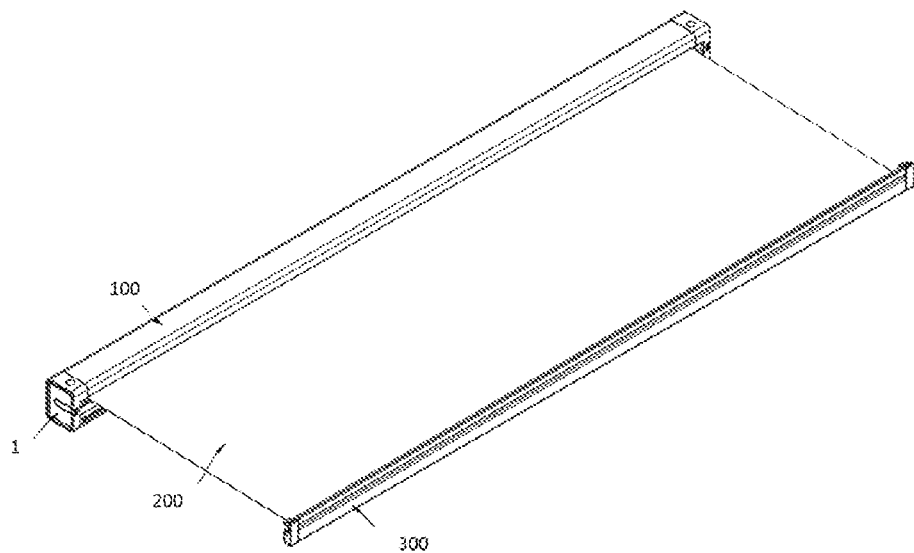
FIG. 1 is a schematic diagram of an entire structure of the present invention.

Reference signs: rear housing 100; awning fabric 200; front rod 300; driving-end decorative cover 1; driving-end inner side cover 2; driving-end pipe stopper 3; spring shaft 4; volute spiral spring 5; reel pipe 6; driven-end pipe stopper 7; driven-end fixing pin 8; driven-end inner side cover 9; driven-end decorative cover 10; locking bar 301; front rod side cover 302; spring 303; wrench 304; self-locking ratchet 91; self-locking pawl 92; first torsional spring 93; support plate 101; second torsional spring 102; threaded hole 103; waterproof cover 105; sealing ring 106; through hole 107; support rod 104; and end socket part 11.

DETAILED DESCRIPTION OF THE EMBODIMENTS

In order to make the objectives, technical solutions, and advantages of the embodiments of the present invention clearer, the technical solutions in the embodiments of the present invention are described clearly and completely below in conjunction with the drawings in the embodiments of the present invention. Therefore, the following detailed description for the embodiments of the present invention provided in the accompanying drawings is not intended to limit the scope of the claimed present invention, but merely represents selected embodiments of the present invention. Based on the embodiments in the present invention, all other embodiments obtained by those of ordinary skill in the art without doing creative work shall fall within the protection scope of the present invention.

In the description of the present invention, it should be noted that orientations or positional relationships indicated by the terms "center", "upper", "lower", "vertical", "horizontal", "inside", "outside" and the like are orientations or positional relationships as shown based on the drawings, or orientations or positional relationships where this invention product are usually placed, and are only for the purpose of facilitating and simplifying the description of the present invention instead of indicating or implying that devices or elements indicated must have particular orientations, and be constructed and operated in the particular orientations, so that these terms cannot be construed as limiting the present invention. In addition, the terms "first", "second", "third", etc. are only for the purpose of distinguishing descriptions, and may not be understood as indicating or implying the relative importance.

In addition, the terms "horizontal", "vertical", and the like do not mean that the component is required to be absolutely horizontal or overhanging, but may be slightly inclined. For example, "horizontal" only means that its direction is more horizontal than "vertical", and it does not mean that the structure must be completely horizontal, but can be slightly inclined.

In the description of the present invention, it should be further noted that unless otherwise explicitly specified and defined, the terms "disposed", "mounted" and "connected" shall be understood broadly, and may be, for example, fixedly connected, or detachably connected, or integrally connected, or directly connected, or indirectly connected through an intermediate medium, or interconnection between two elements. Those of ordinary skill in the art can understand the specific meanings of the above terms in the present invention according to specific situations.

Embodiment I

Figure 2:
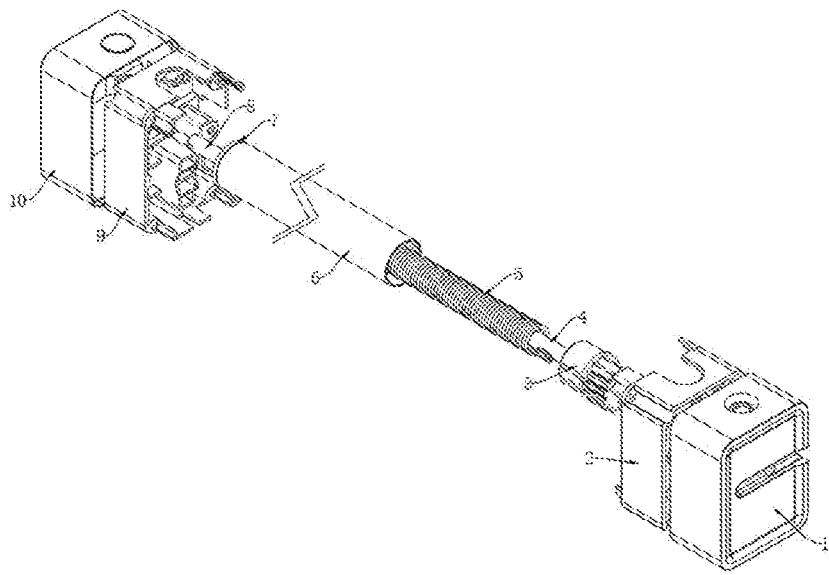
FIG. 2 is a schematic diagram of an entire structure of an automatic rollback mechanism of the present invention.

As shown in FIGS. 1 and 2, a wind in and wind out structure of an awning provided by the present invention includes a rear housing 100; an inside of the rear housing 100 is rotatably connected with a reel pipe 6; a surface of the reel pipe 6 is wound with an awning fabric 200; one end of the awning fabric is connected with a front rod 300; a front end of the rear housing 100 is provided with a driving-end inner side cover 2; an outer side of the driving-end inner side cover is sleeved with a driving-end decorative cover 1; a rear end of the rear housing 100 is provided with a driven-end inner side cover 9; an outer side of the driven-end inner side cover 9 is sleeved with a driven-end decorative cover 10; the reel pipe 6 is mounted between the driving-end inner side cover and the driven end inner side cover; an automatic rollback mechanism is arranged inside the reel pipe 6; and the driving-end decorative cover and the driven-end decorative cover are provided with locking structures used for locking or unlocking the wound front rod 300.

Embodiment II

Figure 3:
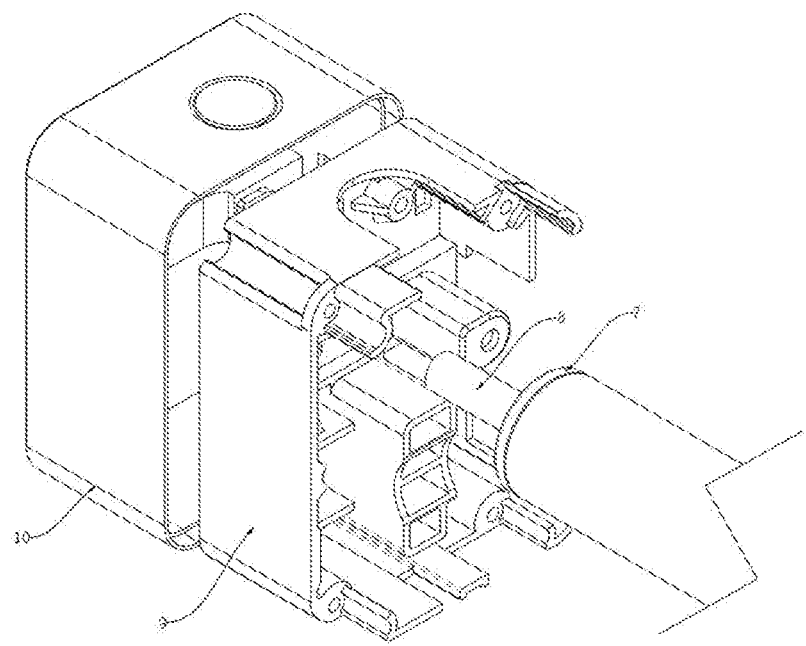
FIG. 3 is a schematic diagram of a driven-end structure of the present invention.

As shown in FIGS. 2 and 3, on the basis of Embodiment I, in the present invention, the automatic rollback mechanism is disposed as follows: an inner end of the driving-end inner side cover 2 is fixedly connected with a spring shaft 4; an outer side of the spring shaft 4 close to the driving-end inner side cover 2 is rotatably connected with a driving-end pipe stopper 3; one end of the driving-end pipe stopper 3 facing away from the driving-end inner side cover is fixedly connected with a volute spiral spring 5; the volute spiral spring 5 is sleeved on the outer side of the spring shaft 4; the other end of the volute spiral spring 5 is fixedly connected to the spring shaft 4; the end of the driving-end pipe stopper 3 facing away from the driving-end inner side cover 2 is fixedly connected with one end part of the reel pipe 6; the volute spiral spring 5 is arranged inside the reel pipe 6; the other end part of the reel pipe 6 is fixedly connected with a driven-end pipe stopper 7; one end of the driven-end pipe stopper 7 facing away from the reel pipe 6 is fixedly connected with a driven-end fixing pin 8; and the driven-end fixing pin 8 is rotatably connected into the driven-end inner side cover 9.

Embodiment III

Figure 4:
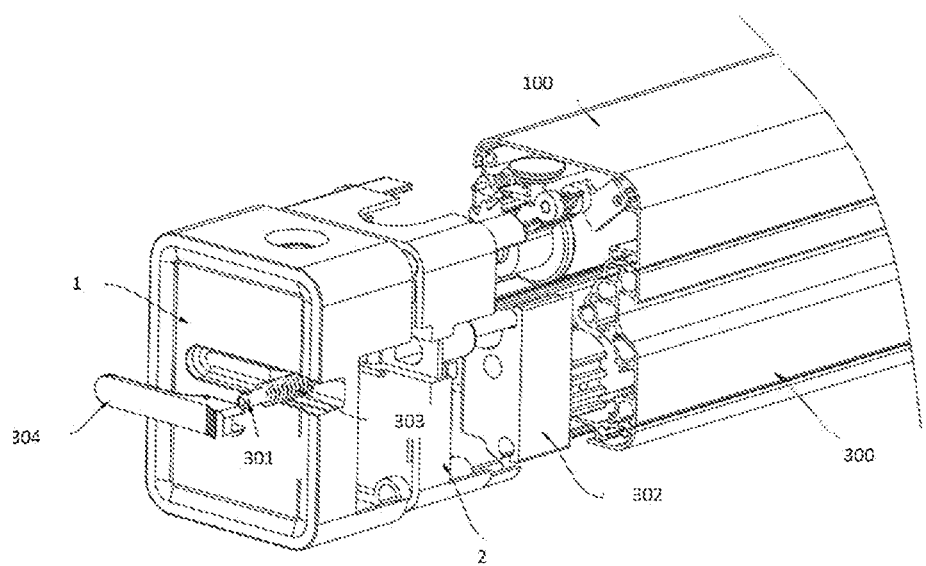
FIG. 4 is a schematic diagram of a driving-end structure of the present invention.
Figure 5:
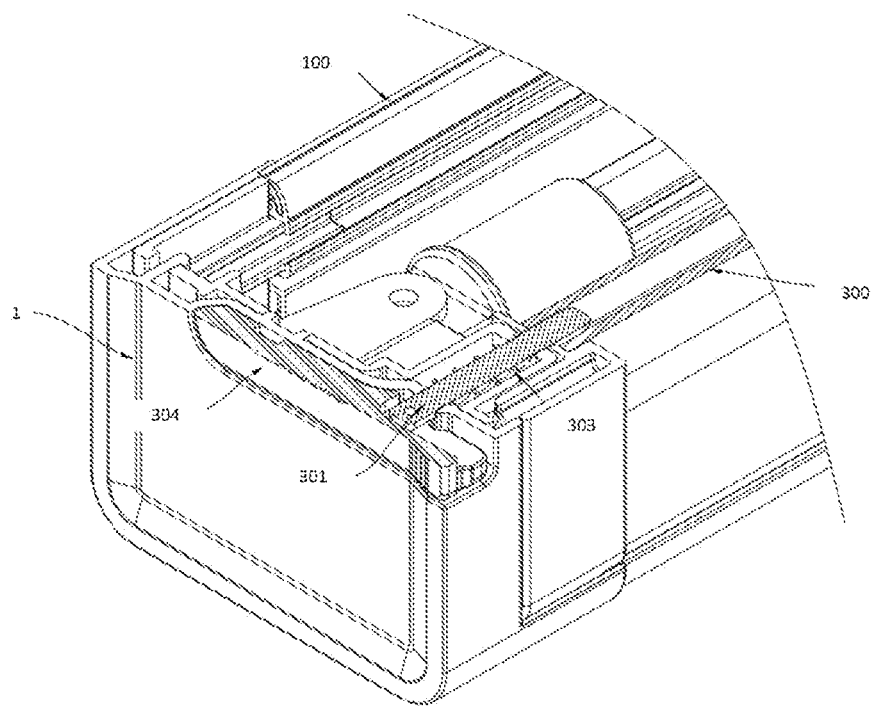
FIG. 5 is a schematic diagram of a closed state of a locking structure of the present invention.
Figure 6:
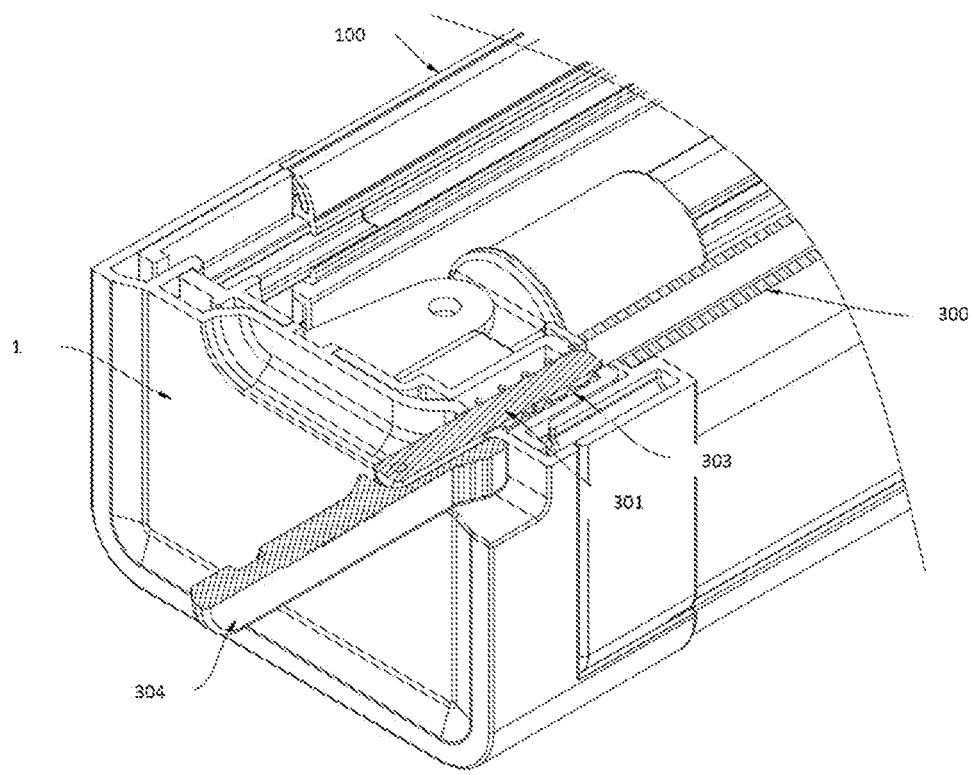
FIG. 6 is a schematic diagram of an opened state of a locking structure of the present invention.

As shown in FIGS. 4-6, on the basis of Embodiment I, in the present invention, the locking structures include locking bars 301; two ends of the front rod 300 are cooperatively provided with front rod side covers 302; corresponding via holes are formed inside the driving-end decorative cover 1, the driving-end inner side cover 2, and the front rod side covers 302; the locking bars 301 penetrate through the corresponding via holes of the driving-end decorative cover 1, the driving-end inner side cover 2, and the front rod side covers 302, so as to be plugged into or pulled out of the front rod 300 to lock or unlock the front rod.

Alternatively, in the present invention, outer sides of the locking bars 301 are sleeved with springs 303; one end of each spring 303 is stopped to each locking bar 301, and the other end is stopped in the driving-end decorative cover 1; an outer end of each locking bar 301 is rotatably connected with a wrench 304; a groove is formed in a surface of the driving-end decorative cover; and the wrench 304 is matched with the groove.

Embodiment IV

Figure 7:
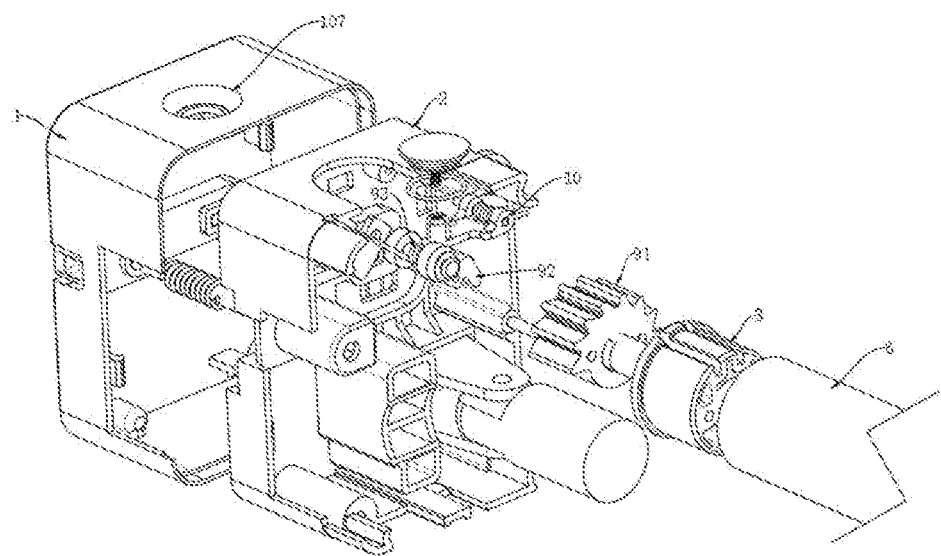
FIG. 7 is a schematic structural diagram of an automatic ratchet and an automatic pawl of the present invention.
Figure 8:
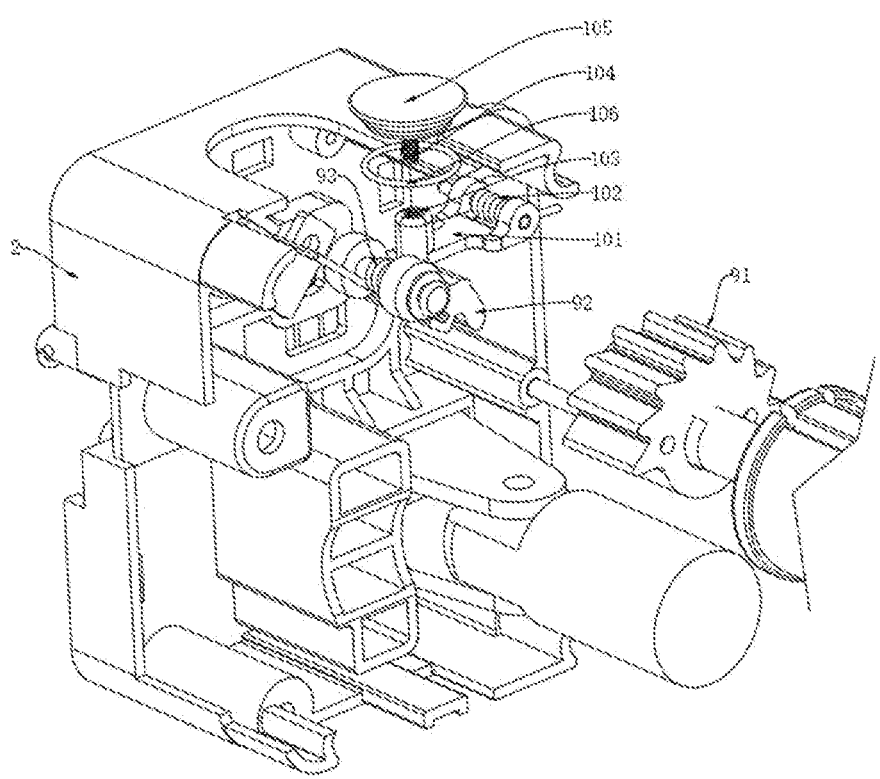
FIG. 8 is a schematic diagram of an automatic ejection mechanism of the present invention.
Figure 9:
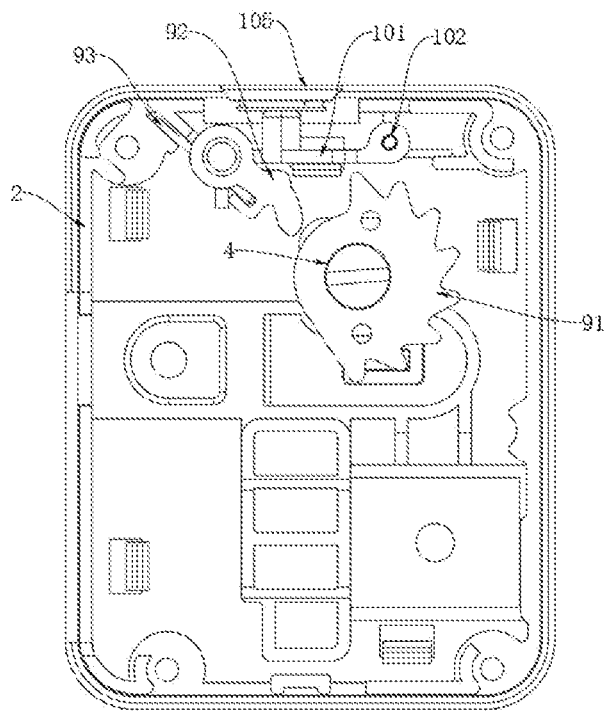
FIG. 9 is a schematic diagram of a rest state of a ratchet and a pawl of the present invention.
Figure 10:
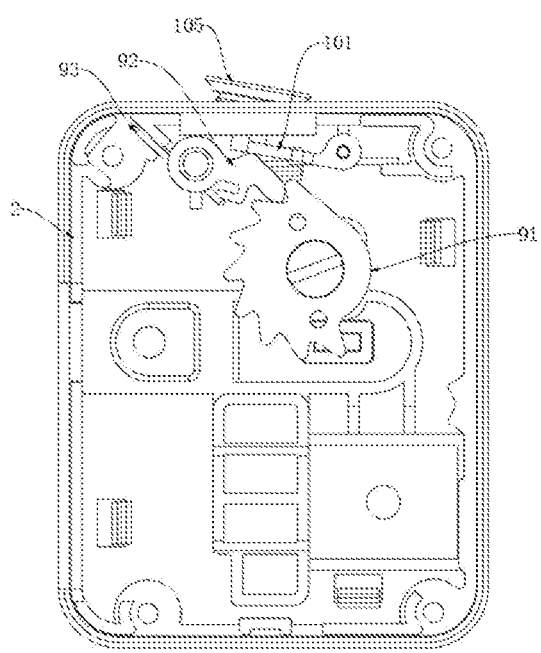
FIG. 10 is a schematic diagram of a working state of a ratchet and a pawl of the present invention.
Figure 11:
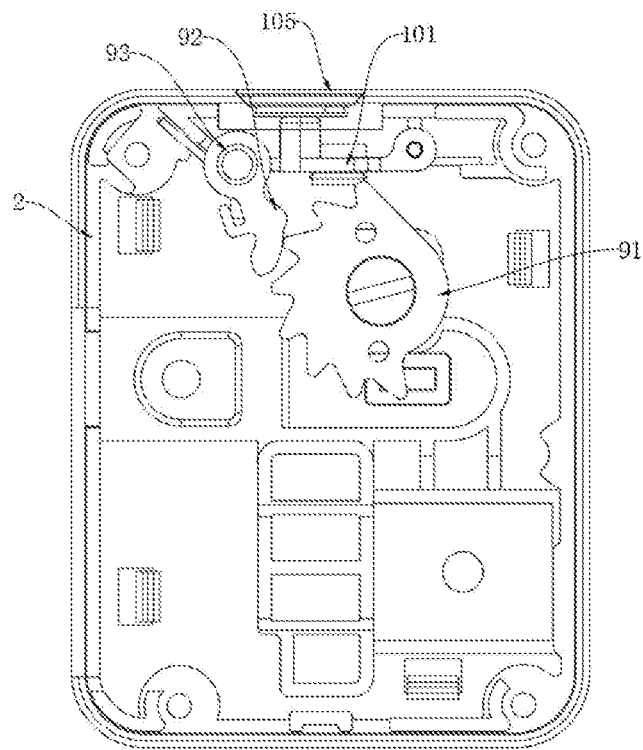
FIG. 11 is a schematic diagram of a yield state of a ratchet and a pawl of the present invention.

As shown in FIG. 7, on the basis of the above embodiments, in the present invention, one side end of the driving-end pipe stopper 3 close to the driving-end inner side cover 2 is fixedly connected with a self-locking ratchet 91, and/or one side end of the driven-end pipe stopper 7 close to the driven-end inner side cover 9 is fixedly connected with a self-locking ratchet 91; a surface of each self-locking ratchet 91 includes a neutral position part and a tooth part; an inner side of the driving-end inner side cover 2 and/or the driven-end inner side cover 9 is rotatably connected with a self-locking pawl 92 through a rotating shaft; the rotating shaft of the self-locking pawl 92 is sleeved with a first torsional spring 93; one end of the first torsional spring 93 presses against an inner surface of the driving-end inner side cover and/or the driven-end inner side cover; and the other end of the first torsional spring 93 presses against a surface of the self-locking pawl 92.

Embodiment V

As shown in FIGS. 8-11, on the basis of Embodiment IV, in the present invention, an ejection mechanism is arranged inside the driving-end inner side cover and/or the driven-end inner side cover in a penetrating manner; the ejection mechanism includes a support plate 101 rotatably connected to an inner wall of the driving-end inner side cover 2 and/or the driven-end inner side cover 9 through a connection shaft; an upper surface of one end of the support plate 101 is connected with an ejection subassembly; an upper end of the driving-end inner side cover and/or the driven-end inner side cover is provided with an opening; a through hole 107 is formed in a surface of the upper end of the driving-end inner side cover and/or the driven-end inner side cover; the positions of the ejection subassembly, the through hole, and the opening are correspondingly disposed; the self-locking pawl 92 in a natural state is in contact with a surface of a lower end of the support plate 101; and the self-locking pawl 92 jacks up the support plate 101 when meshed with the self-locking ratchet 91.

Alternatively, in the present invention, the connection shaft of the support plate is sleeved with a second torsional spring 102; one end of the second torsional spring 102 is connected with the inner wall of the driving-end inner side cover and/or the driven-end inner side cover; and the other end of the second torsional spring 102 is connected with the support plate 101.

Alternatively, in the present invention, the ejection subassembly includes a waterproof cover 105; the waterproof cover is matched with the through hole 107; a lower end of the waterproof cover on an inner surface of the through hole 107 is provided with a sealing ring 106; a lower surface of the waterproof cover is hooked with a support rod 104; and a lower end of the support rod is connected with the support plate.

Embodiment VI

Figure 12:
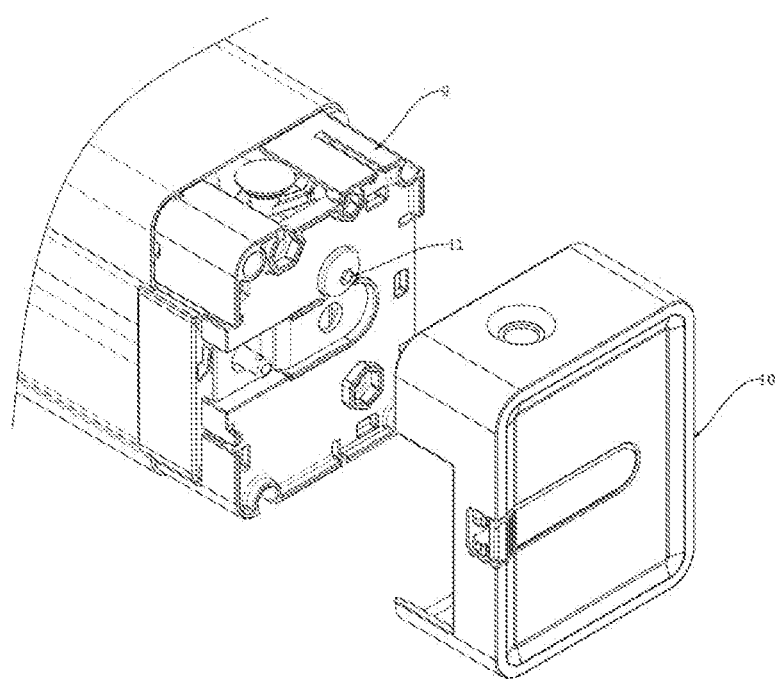
FIG. 12 is a schematic diagram of an end socket part of a driven-end fixing pin of the present invention.

As shown in FIG. 12, further, in the present invention, the driving-end inner side cover is detachably mounted in one end of the driving-end decorative cover; and the driven-end inner side cover is detachably mounted in one end of the driven-end decorative cover.

Alternatively, in the present invention, one end of the driven-end fixing pin 8 penetrates through the driven-end inner side cover 9 and is fixedly connected with an end socket part 11; a screw hole is formed in a surface of the end socket part; a prestress can be applied to the torsional spring in the reel pipe after the driven-end decorative cover is removed; and manual winding is carried out when the torsional spring fails.

Embodiment VII

On the basis of the above wind in and wind out structure of the awning, the present invention further provides an application of the above-mentioned wind in and wind out structure of the awning. The wind in and wind out structure of the awning is applied to an automobile and a recreational vehicle and is used for shielding sunlight, rain, snow or dust. A lamp strip and/or a tent can also be selectively mounted on the wind in and wind out structure of the awning.

The specific working principle and working process of the present invention are as follows:

When the awning fabric is opened, the reel pipe will be pulled to rotate under the action of the driving-end pipe stopper and the driven-end pipe stopper. Since one end of the volute spiral spring is fixedly connected with the driving-end pipe stopper, and the other end of the volute spiral spring is fixedly connected with the surface of the spring shaft, when the driving-end pipe stopper rotates, the volute spiral spring can rotate to generate a spring torsion; when it is necessary to roll up the awning fabric, the spring torsion of the volute spiral spring will drive the reel pipe to automatically retract, instead of manually rotating the reel pipe, so that the operation is relatively convenient, and man power is saved.

When the awning fabric is spread, the awning fabric is pulled to cause the reel pipe to rotate, through the driving-end pipe stopper, the spring shaft, the driven-end pipe stopper and a pin shaft, between the driving-end inner side cover and the driven-end inner side cover. In this process, the rotation of the driving-end pipe stopper will cause the volute spiral spring to rotate to generate a spring torsion, which is convenient for the roll-up of the awning fabric. By the theory of the ratchets, the driving-end pipe stopper can drive the self-locking ratchets to rotate clockwise. When the self-locking ratchets rotate clockwise, the tooth parts are meshed with the self-locking pawl to compress the first torsional spring. The self-locking ratchets may be locked by the self-locking pawl when anticlockwise rotating, so that the reel pipe cannot rotate reversely to roll up the awning fabric. At the same time, the self-locking ratchets can push the self-locking pawl to the upper right position, and the support plate can be jacked up through the self-locking pawl, so that the waterproof cover at the upper end of the support plate is ejected out of the surface of the through hole, and it can be directly seen that the awning fabric is in a locked state at this time. When it is necessary to roll up the awning fabric, the awning fabric is pulled outwards at first to enable the self-locking pawl to point to the neural position parts of the self-locking ratchets. At this time, the self-locking pawl can be rebounded to an initial position at 0 degree through the first torsional spring. When the awning fabric is rolled up, the self-locking ratchets push the self-locking pawl to the left position, and the self-locking pawl is not meshed with the tooth parts of the self-locking ratchets. A resilience force of the volute spiral spring can make the reel pipe to reversely rotate to roll up awning fabric. When the self-locking pawl is at the left position, it does not extrude the support plate, and the support plate is reset under the action of the second torsional spring, so that the waterproof cover can be moved into the through hole. This device can prevent the awning fabric from rotating back after the awning fabric is spread and firmly fix the awning fabric, can directly show whether the awning fabric is in the locked state, and is convenient for the unlocking operation.

When a wind in torsional spring fails or is stuck, a driven-end decorative cover can be removed from a driven-end inner side cover, and an electric drill, a screwdriver, or other tools is inserted into a rotating hole to rotate a fixed pin shaft, which achieves an emergency purpose and avoids the problem that the wind in torsional spring fails in driving the awning fabric to be rolled up, and the operation is relatively convenient.

Before the awning fabric is spread, the wrenches are rotated to be pulled out of the grooves. The wrenches are pulled to separate the rear ends of the locking bars from the front rod and the front rod side covers, and the springs are compressed. At this time, the front rod can be pulled to pull the awning fabric out of the rear housing. After the awning fabric is completely rolled up, in order to prevent the awning from being opened due to bump or other reasons, the wrenches can be released to cause the locking bars to be inserted into the front rod and the front rod side covers. The front rod side covers can be fixed by the locking bars, so that the awning fabric is avoided from sliding out of the rear housing; the fixing is firmer, and the operation is convenient. The wrenches are rotated to snap the fabric in the grooves to reduce the occupied space and make it look beautiful.

The above descriptions are merely preferred embodiments of the present invention and are not intended to limit the present invention. For those skilled in the art, the present invention may have various modifications and changes. Any modifications, equivalent replacements, improvements, and the like that are made within the spirit and principle of the present invention shall all fall within the protection scope of the present invention.

What is claimed is:

1. A wind in and wind out structure of an awning, comprising a rear housing; the inside of the rear housing is connected with a rotating reel pipe; a surface of the reel pipe is wound with an awning fabric; one end of the awning fabric is connected with a front rod; a front end of the rear housing is provided with a driving-end inner side cover; an outer side of the driving-end inner side cover is sleeved with a driving-end decorative cover; a rear end of the rear housing is provided with a driven-end inner side cover; an outer side of the driven-end inner side cover is sleeved with a driven-end decorative cover; the reel pipe is mounted between the driving-end inner side cover and the driven end inner side cover;

wherein an automatic rollback mechanism is arranged inside the reel pipe to achieve automatic rollback of the awning fabric; the automatic rollback mechanism comprises: an inner end of the driving-end inner side cover is fixedly connected with a spring shaft; an outer side of the spring shaft close to the driving-end inner side cover is rotatably connected with a driving-end pipe stopper; one end of the driving-end pipe stopper facing away from the driving-end inner side cover is fixedly connected with a volute spiral spring; the volute spiral spring is sleeved on the outer side of the spring shaft; the other end of the volute spiral spring is fixedly connected to the spring shaft; the end of the driving-end pipe stopper facing away from the driving-end inner side cover is fixedly connected with one end part of the reel pipe; the volute spiral spring is arranged inside the reel pipe; the other end part of the reel pipe is fixedly connected with a driven-end pipe stopper; one end of the driven-end pipe stopper facing away from the reel pipe is fixedly connected with a driven-end fixing pin; and the driven-end fixing pin is rotatably connected into the driven-end inner side cover.

2. The wind in and wind out structure of the awning according to claim 1, wherein locking structures are arranged on the driving-end decorative cover and the driven-end decorative cover; the locking structures comprise locking bars; two ends of the front rod are cooperatively provided with front rod side covers; corresponding holes are formed inside the driving-end decorative cover, the driving-end inner side cover, and the front rod side covers; the locking bars penetrate through the corresponding holes of the driving-end decorative cover, the driving-end inner side cover, and the front rod side covers, so as to be plugged into or pulled out of the front rod to lock or unlock the front rod.

3. The wind in and wind out structure of the awning according to claim 2, wherein outer sides of the locking bars are sleeved with springs; one end of each spring is connected to each locking bar, and the other end is connected in the driving-end decorative cover; an outer end of each locking bar is rotatably connected with a wrench; a groove is formed in a surface of the driving-end decorative cover; and the wrench is matched with the groove.

4. The wind in and wind out structure of the awning according to claim 1, wherein one side end of the driving-end pipe stopper close to the driving-end inner side cover is fixedly connected with a self-locking ratchet, and/or one side end of the driven-end pipe stopper close to the driven-end inner side cover is fixedly connected with a self-locking ratchet; a surface of each self-locking ratchet comprises a neutral position part and a tooth part; an inner side of the driving-end inner side cover and/or the driven-end inner side cover is rotatably connected with a self-locking pawl through a rotating shaft; the rotating shaft of the self-locking pawl is sleeved with a first torsional spring; one end of the first torsional spring presses against an inner surface of the driving-end inner side cover and/or the driven-end inner side cover; and the other end of the first torsional spring presses against a surface of the self-locking pawl.

5. The wind in and wind out structure of the awning according to claim 4, wherein an ejection mechanism is arranged inside the driving-end inner side cover and/or the driven-end inner side cover in a penetrating manner; the ejection mechanism comprises a support plate rotatably connected to an inner wall of the driving-end inner side cover and/or the driven-end inner side cover through a connection shaft; an upper surface of one end of the support plate is connected with an ejection subassembly; an upper end of the driving-end inner side cover and/or the driven-end inner side cover is provided with an opening; a through hole is formed in a surface of the upper end of the driving-end decorative cover and/or the driven-end decorative cover; the positions of the ejection subassembly, the through hole, and the opening are correspondingly disposed; the self-locking pawl in a natural state is in contact with a surface of a lower end of the support plate; and the self-locking pawl jacks up the support plate when meshed with the self-locking ratchet.

6. The wind in and wind out structure of the awning according to claim 5, wherein the connection shaft of the support plate is sleeved with a second torsional spring; one end of the second torsional spring is connected with the inner wall of the driving-end inner side cover and/or the driven-end inner side cover; and the other end of the second torsional spring is connected with the support plate.

7. The wind in and wind out structure of the awning according to claim 5, wherein the ejection subassembly comprises a waterproof cover; the waterproof cover is matched with the through hole; a lower end of the waterproof cover on an inner surface of the through hole is provided with a sealing ring; a lower surface of the waterproof cover is hooked with a support rod; and a lower end of the support rod is connected with the support plate.

8. The wind in and wind out structure of the awning according to claim 1, wherein the driving-end inner side cover is detachably mounted in one end of the driving-end decorative cover; and the driven-end inner side cover is detachably mounted in one end of the driven-end decorative cover.

9. The wind in and wind out structure of the awning according to claim 8, wherein one end of the driven-end fixing pin penetrates through the driven-end inner side cover and is fixedly connected with an end socket part; a screw hole is formed in a surface of the end socket part and is configured to allow a prestress to be applied to the torsional spring in the reel pipe through the end socket part to achieve manual winding after the driven-end decorative cover is removed.

* * * * *